(12) United States Patent
Carr, Sr.

(10) Patent No.: US 8,044,796 B1
(45) Date of Patent: Oct. 25, 2011

(54) ELECTRICAL LOCK-OUT AND LOCATING APPARATUS WITH GPS TECHNOLOGY

(76) Inventor: Syd K. Carr, Sr., Emmett, ID (US)

( * ) Notice: Subject to any disclaimer, the term of this patent is extended or adjusted under 35 U.S.C. 154(b) by 1301 days.

(21) Appl. No.: 11/701,755

(22) Filed: Feb. 2, 2007

Related U.S. Application Data

(60) Provisional application No. 60/764,671, filed on Feb. 2, 2006.

(51) Int. Cl.
*G08B 1/08* (2006.01)
(52) U.S. Cl. .............................. 340/539.13; 340/539.32
(58) Field of Classification Search ............ 340/825.69, 340/502, 534, 568.3, 571, 825.22, 5.1, 825.36, 340/7.21, 7.61, 538.15, 539, 539.11, 539.13, 340/539.14, 870.16, 870.07, 505, 518, 539.32
See application file for complete search history.

(56) References Cited

U.S. PATENT DOCUMENTS

| | | | |
|---|---|---|---|
| 5,289,163 A | | 2/1994 | Perez et al. |
| 5,337,041 A | | 8/1994 | Friedman |
| 5,365,225 A | * | 11/1994 | Bachhuber .................. 340/5.26 |
| 5,638,050 A | | 6/1997 | Sacca et al. |
| 5,748,084 A | * | 5/1998 | Isikoff ....................... 340/568.1 |
| 5,926,090 A | | 7/1999 | Taylor et al. |
| 5,939,981 A | | 8/1999 | Renney |
| 6,181,253 B1 | * | 1/2001 | Eschenbach et al. ...... 340/573.4 |
| 6,609,656 B1 | | 8/2003 | Elledge |
| 6,859,349 B2 | * | 2/2005 | Barna .............................. 361/42 |
| 6,864,789 B2 | * | 3/2005 | Wolfe ........................ 340/539.1 |
| 6,891,471 B2 | | 5/2005 | Yuen et al. |
| 7,012,503 B2 | * | 3/2006 | Nielsen .......................... 340/5.6 |
| 7,205,890 B2 | * | 4/2007 | Defant et al. ............ 340/539.13 |
| 7,319,395 B2 | * | 1/2008 | Puzio et al. ................. 340/572.1 |
| 7,424,291 B1 | * | 9/2008 | Lunsford et al. .............. 455/420 |
| 2004/0054658 A1 | * | 3/2004 | Spalink et al. ..................... 707/3 |
| 2004/0145520 A1 | * | 7/2004 | Richardson et al. ..... 342/357.07 |
| 2005/0017851 A1 | * | 1/2005 | Allison ...................... 340/425.5 |
| 2005/0174235 A1 | * | 8/2005 | Davis et al. ............. 340/539.13 |

* cited by examiner

*Primary Examiner* — Daniel Wu
*Assistant Examiner* — Rufus Point
(74) *Attorney, Agent, or Firm* — Montgomery Patent & Design; Robert C. Montgomery; Joseph T. Yoksich

(57) ABSTRACT

A system and method by which construction tools, electronics, and other electrically powered devices are protected from theft and unauthorized use is disclosed. A tool or electronic device is equipped with an electronic receiver that receives an authorization code from a remote transmitter. Should the item be stolen, the rightful owner can disable it remotely, rendering it worthless. Additionally, the system provides for a Global Positioning System Receiver (GPS) that allows the invention to determine its physical location to within a few feet anywhere on the face of the earth, and transmit its location to the original owner such that it may be recovered. The use of the present invention allows for increased security of portable tools and electronics in a manner that is quick, easy and effective.

16 Claims, 5 Drawing Sheets

ELECTRICAL LOCK-OUT AND LOCATING APPARATUS WITH GPS TECHNOLOGY

RELATED APPLICATIONS

The present invention was first described in U.S. Provisional Patent Application No. 60/764,671 filed on Feb. 2, 2006.

FIELD OF THE INVENTION

The present invention relates generally to a system and method by which construction tools, electronics, and other electrically powered devices are protected from theft and unauthorized use and, more particularly, to the equipment to be protected being equipped with an electronic receiver that receives an authorization code from a remote transmitter with the inclusion of a global positioning system such that the equipment can be recovered.

BACKGROUND OF THE INVENTION

Security alarms are almost common items on homes, businesses, and motor vehicles in today's society. Their use has not only stopped many attempted thefts in progress, but the knowledge that they are there, has stopped many more before they are even started. While such alarms work well for homes, businesses, motor vehicles and other large structures, they leave smaller portable devices such as construction tools and portable electronics vulnerable. These devices such as drills, saws, compressors, generators, televisions, computers, notebook computers and the like are often very expensive, and present a financial hardship should they need to be replaced. Should insurance be utilized to cover such devices, the cost of the insurance is often as great as the device itself due to the high probability of being stolen.

Solving the problem described immediately above, is a unique system and method by which construction tools, electronics, and other electrically powered devices are protected from theft and unauthorized use. Upon initial observation of a power tool such as a saw or drill, or an electronic device such as a television or computer, nothing appears readily different. However, after closer observation, it can be seen that the tool or electronic device is equipped with an electronic receiver that receives an authorization code from a remote transmitter. This enables the equipment to operate. Should the item be stolen, the rightful owner can disable it remotely, rendering it worthless. Additionally, the system provides for a Global Positioning Receiver (GPS) that allows the invention to determine its physical location to within a few feet anywhere on the face of the earth, and transmit its location to the original owner such that it may be recovered. The use of the new and novel tracking system for tools and electronics allows for increased security of portable tools and electronics in a manner which is quick, easy and effective.

Several attempts have been made in the past to effectively locate, tack, and command electrically-operated equipment from a remote location. U.S. Pat. No. 6,891,471, issued in the name of Yuen et al., discloses an expandable object tracking system and devices, wherein each device has an RF transceiver, memory, user interface, and a processor for coordination and management. Unfortunately, the Yuen et al. system does not include the use of GPS technology to track and locate these devices over a broad range.

U.S. Pat. No. 6,609,655, issued in the name of Elledge, describes a method and system for identifying lost or stolen devices, including a transmitter, a receiver, and a computer each coupled to the device. The device utilizes RF identification and operates an alarm. As in the Yuen et al. device, the Elledge patent does not incorporate GPS locating technology within the system.

U.S. Pat. No. 6,336,202, issued in the name of Tsuchimoto et al., teaches a data storage system, storage medium, and a method of controlling a data storage system. Such a data storage system does not fall under the scope of the present invention.

U.S. Pat. No. 5,939,981, issued in the name of Renney, discloses an item locator with an attachable receiver/transmitter, comprising a hand-held device and multiple sensors/chips applied to the device in question. The sensors receive a dedicated signal transmitted by the hand-held device and sound an audible alarm. The Renney device unfortunately differs from the present invention in that it does not have provisions for commanding such a sensor and also does not incorporate GPS locating technology.

Additional patents have been issued, based on systems for locating a lost object with an audible alarm, notably U.S. Pat. No. 5,638,050, issued in the name of Sacca et al.; and, U.S. Pat. No. 5,926,090, issued in the name of Taylor et al.

None of the prior art particularly describes device for locating and commanding electrically-operated equipment such as construction tools at a remote site utilizing GPS technology. Accordingly, there is a need for a means by which construction tools, and portable electronics can be protected from theft, unauthorized use and should theft occur, subsequent recovery can be provided.

SUMMARY OF THE INVENTION

In view of the foregoing disadvantages inherent in the prior art, it has been observed that there is need of a means for monitoring a first location of electrically-powered devices from a remote location and also to transmit command functions from a remote location to a control module located on said equipment.

The object of the present invention is to provide an apparatus and method for an electrical device lock-out and locating apparatus utilizing GPS technology which provides a means for a system by which construction tools, electronics, and other electrically-powered devices are protected from theft and unauthorized use.

A further object of the present invention provides for such an apparatus to further comprise at least one control module which is removably mounted discreetly to said electrically-powered devices, thereby providing wireless data transmission to a handheld controller.

A further object of the present invention provides for said control module to further comprise a receiver for receiving specific commands entered on said handheld controller, such as operational permission and operational denial, to said electrically operated device. Said control module further generates and transmits physical location data back to said handheld controller and operates with any alternating current (AC) powered device using a power cord.

A further object of the present invention provides for said control module to comprise a plastic enclosure further comprising an electrical power cord, an indicator light, a power supply receiving an alternating current (AC) from said electrical power cord ahead of a main power relay, wherein said power supply produces and conducts a regulated output voltage to a GPS receiver, a control receiver and a controller. Said control receiver is a conventional digital data transceiver that communicates a receiver bi-directional RF data stream as received from said transmission relaying system to said controller and in a reverse path. Said controller is a digital-type controller such as a basic stamp package or an embedded processor and provides an electrical current to said main power relay, thus closing a circuit between said electrical power cord and an electrical power circuit of an electrically-operated device upon receiving a valid operational signal from said handheld controller via said transmission relaying system. Said controller also communicates said first location information as provided by said GPS receiver, to said control receiver for rebroadcast back to said handheld controller. Said indicator light provides a visual means to indicate current is being supplied to said electrically-operated device.

Yet another object of the present invention provides for a handheld controller which is used to access various functions such as control, permissive, lockout and location functions. The handheld controller operates wirelessly and is battery-powered.

Still yet another object of the present invention provides for said handheld controller to further comprise a graphic output screen, a controller antenna located on top of said handheld controller to transmit a transmitter bi-directional RF data stream to said transmission relaying system, a command-accepted light emitting diode located below said graphic output screen to confirm to a user that commands as entered into said handheld controller were acknowledged by said control module, a menu access button located below said graphic output screen for accessing menu functions, a numeric keypad located below said graphic output screen to access specific coded functions, an enter button and a clear button located below said graphic output screen, and, a series of selection keys located below said graphic output screen to access displayed items or options on said graphic output screen.

A further object of the present invention provides for such an apparatus to utilize available transmission relaying systems and Global Positioning System (GPS) technology so as to locate, disable, and/or recover said electronic devices in an accurate, quick, and effective manner.

Still a further object of the present invention provides for a system by which said control module receives location information from a series of Global Positioning Satellites (GPS), via an RF broadcast stream emitted in a one-way broadcast type signal from each Global Positioning Satellite (GPS), thus allowing said control module to establish its position on the surface of the earth to within a few feet via a triangulation method, utilizing said first location of said control module mounted on electrically-operated device and an accurate time signal.

Another object of the present invention is to provide a separate transmission relaying system, comprising available wireless systems, such as cellular telephone or PCS systems, satellite systems, or wireless area networks capable of sending and receiving a transmitter bi-directional RF data stream to and from said control module and sending and receiving a receiver bi-directional RF data stream to and from said handheld controller, respectively, thereby providing a tracking means of said control module mounted on said electrically-operated device. Said transmission relaying system is necessary due to low-power operation and long-distance operational requirements of both said handheld controller and said control module and achieves a full-duplex communication with each said GPS.

BRIEF DESCRIPTION OF THE DRAWINGS

The advantages and features of the present invention will become better understood with reference to the following more detailed description and claims taken in conjunction with the accompanying drawings, in which like elements are identified with like symbols and in which:

DESCRIPTIVE KEY

Figure 1:
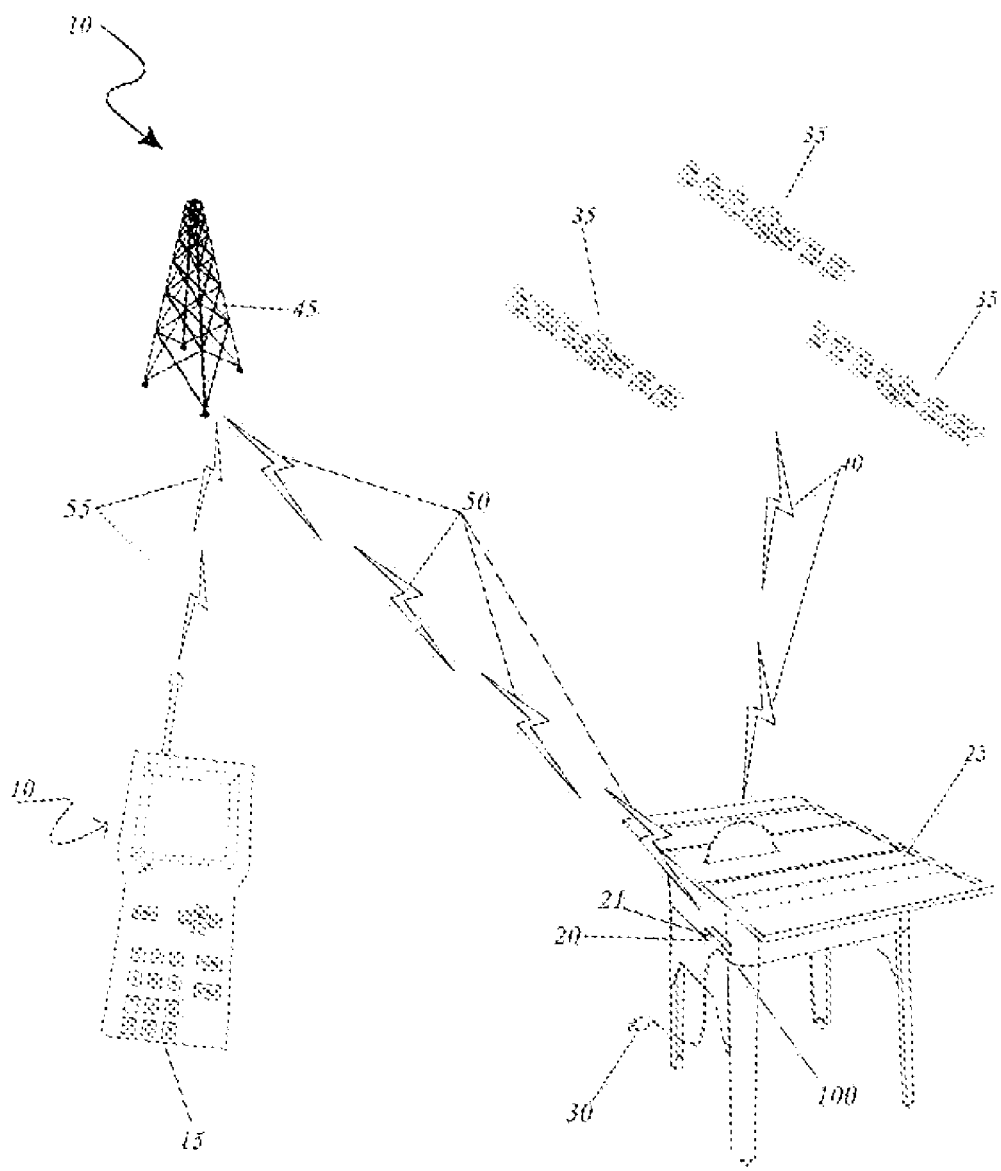
FIG. 1 is a pictorial operational representation of the electrical device lock-out and locating apparatus utilizing GPS technology 10, according to the preferred embodiment of the present invention; and, FIG. 2 is a front view of the handheld controller 15 portion of the electrical lock-out and locating apparatus utilizing GPS technology 10, according to the preferred embodiment of the present invention; and, FIG. 3 is a close-up perspective view of the control module portion 20 of the electrical lock-out and locating apparatus utilizing GPS technology 10, according to the preferred embodiment of the present invention; and, FIG. 4 is an electrical schematic block diagram of the control module 20 portion of the electrical device lock-out and locating apparatus utilizing GPS technology 10, according to the preferred embodiment of the present invention; and, FIG. 5 is a functional block diagram of the operational logic employed by the electrical device lock-out and locating apparatus utilizing GPS technology 10, according to the preferred embodiment of the present invention.

| | |
|---|---|
| 10 | electrical device lock-out and locating apparatus utilizing GPS technology |
| 15 | handheld controller |
| 20 | control module |
| 21 | indicator light |
| 25 | electrically-operated device |
| 30 | electrical power cord |
| 35 | Global Positioning Satellite (GPS) |
| 40 | position locating RF |
| 45 | transmission relaying system |
| 50 | receiver bi-directional RF data stream |
| 55 | transmitter bi-directional RF data stream |
| 60 | graphic output screen |
| 65 | controller antenna |
| 70 | command accepted light emitting diode |
| 75 | menu access button |
| 80 | numeric keypad |
| 85 | enter button |
| 90 | clear buttons |
| 95 | selection keys |
| 100 | plastic enclosure |
| 105 | power supply |
| 110 | main power relay |
| 115 | GPS receiver |
| 120 | control receiver |
| 125 | controller |
| 130 | electrical power circuit of an electrically operated device |
| 140 | first operational block |
| 145 | second functional block |
| 150 | second operational block |
| 155 | third functional block |
| 160 | third operational block |
| 165 | fourth functional block |

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for an electrical device lock-out and locating apparatus utilizing GPS technology (herein described as the "apparatus") 10, which provides a means for a system and method by which construction tools, electronics, and other electrically-operated devices 25 are protected from theft and unauthorized use. The apparatus 10 comprises a control module 20 which is installed discreetly to said electrically-operated devices 25, thereby providing wireless data transmission to a handheld controller 15. By utilizing available transmission relaying systems 45 and Global Positioning System (GPS) technology, the apparatus 10 can locate, disable, and/or recover said electronic devices in an accurate, quick, and effective manner.

Referring now to FIG. 1, a pictorial operational representation of the apparatus 10, according to the preferred embodiment of the present invention, is disclosed. The apparatus 10 comprises two major components. The first major component is a handheld controller 15 which is used to access the various functions of the apparatus 10 such as control, permissive, lockout and location functions. The handheld controller 15 operates wirelessly and is battery-powered. The second major component is a control module 20 removably mounted discreetly upon an electrically-operated device 25. The control module 20, receives specific commands entered on the handheld controller 15, such as operational permission and operational denial, to the electrically-operated device 25. The control module 20 further provides transmission of physical location data back to the handheld controller 15. The apparatus 10 can comprise a single or a plurality of control modules 20. The electrically-operated device 25 in FIG. 1 is depicted as a portable power tool such as a table saw for illustrative purposes only. The control module 20 will work with any alternating current (AC) powered device 25 using a power cord 30. Such electrically-operated devices 25 are envisioned to be equipment such as, but not limited to; portable power tools, yard care power tools, appliances, personal computers, notebook computers, electronic devices, entertainment systems, charging systems, and the like, and as such, should not be interpreted as a limiting factor of the present invention. A further detailed description of the control module 20 along with its internal components will be provided herein below. The control module 20 receives location information from a series of Global Positioning Satellites (GPS) 35 whose operational sequences are well known in the art and are not within the scope of this disclosure. A position-locating RF broadcast stream 40 is emitted in a one-way broadcast type signal from each Global Positioning Satellite (GPS) 35 thus allowing the control module 20 to establish its position on the face of the earth to within a few feet. It should be noted that the current GPS positioning system as operated by the United States Government serves as the basis for this disclosure depicted, however, systems in place by other governments as well as future systems deployed by any government will work equally as well with the present invention and as such, should not be interpreted as a limiting factor of the present invention. Should future GPS systems allow for two-way transmission of information, the principles of operation of the present invention will remain as noted, however, implementation will vary. The multiple position-locating RF broadcast stream 40 allows for triangulation of the position of the electrically-operated device 25 based upon known positions of the control module 20 and an accurate time signal. To accomplish transmission of data from the control module 20 to the handheld controller 15, a separate transmission relaying system 45 is necessary. The transmission relaying system 45 provides a tracking means of the electrically-operated device 25 anywhere on the face of the earth. The transmission relaying system 45 is necessary due to the low power operation of both the handheld controller 15 and control module 20, and the long distance requirements between the handheld controller 15 and the control module 20. The transmission relaying system 45 comprises available wireless systems, such as cellular telephone or PCS systems, satellite systems, wireless area networks and the like, which are outside the scope of the present invention, and should not be interpreted as a limiting factor of the present invention. The transmission relaying system 45 is capable of sending/receiving a receiver bi-directional RF data stream 50 to/from the control module 20 and sending/receiving a transmitter bi-directional RF data stream 55 to/from the handheld controller 15 respectively as indicated. The receiver bi-directional RF data stream 50 and the transmitter bi-directional RF data stream 55, in conjunction with the transmission relaying system 45 provide full-duplex communication between the handheld controller 15 and the control module 20 which the Global Positioning Satellite (GPS) 35, in their current configuration, are not capable of.

Figure 2:
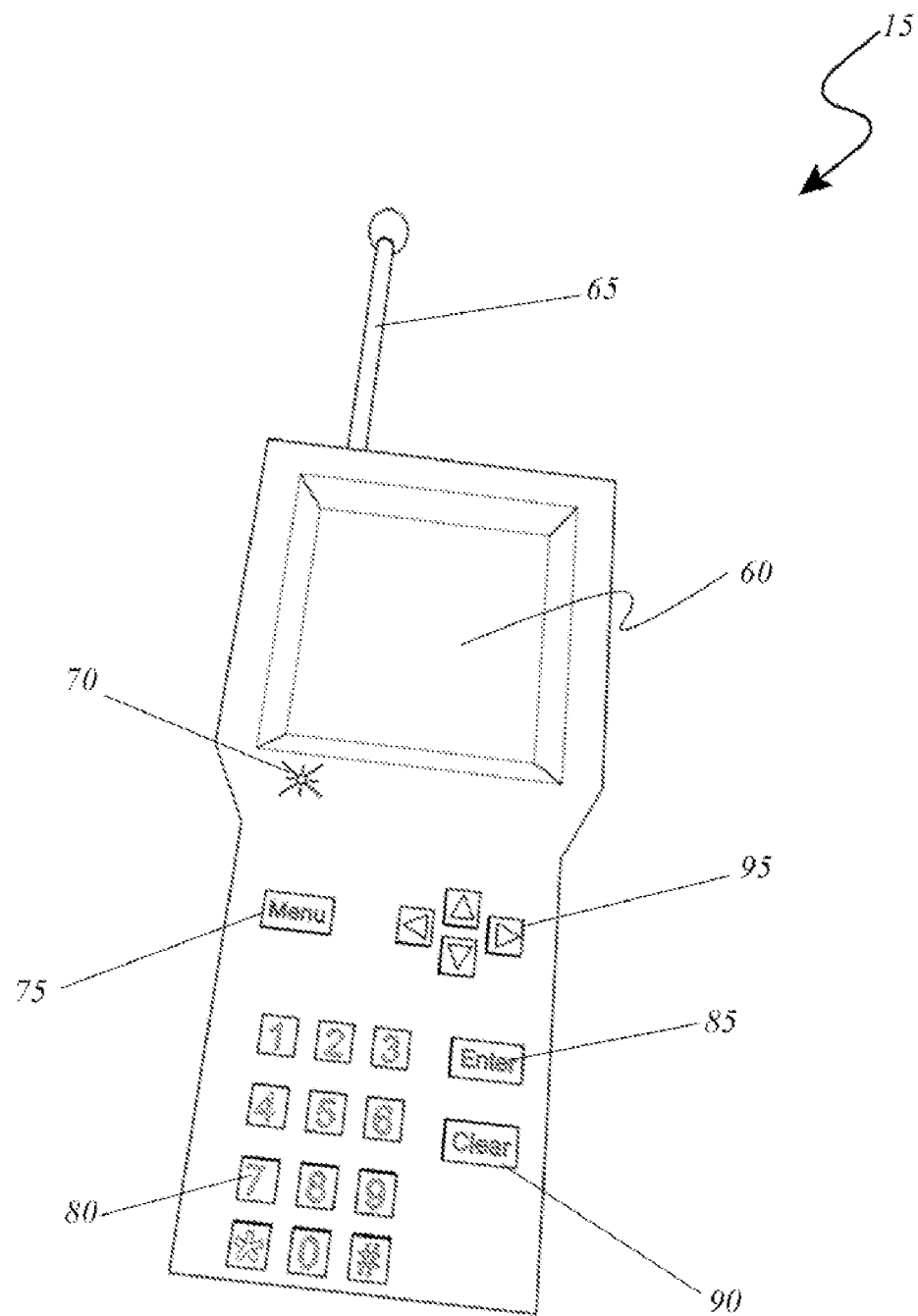

Referring now to FIG. 2, a front view of the handheld controller 15 portion of the apparatus 10, according to the preferred embodiment of the present invention, is disclosed. The handheld controller 15 provides a graphic output screen 60, such as an LCD screen or the like, to communicate with the user. A controller antenna 65 is located on the top of the handheld controller 15 to communicate with the transmission relaying system 45 (as shown in FIG. 1) via the transmitter bi-directional RF data stream 55 (as shown in FIG. 1) and then subsequently with the control module 20 mounted on the electrically-operated device 25 via the receiver bi-directional RF data stream 55 (as shown in FIG. 1). A command-accepted light emitting diode 70 is provided directly below the graphic output screen 60 to confirm to the user that commands as entered into the handheld controller 15 were acknowledged by the control module 20 (as shown in FIG. 1). Further information on the operation and functionality of the command accepted light-emitting diode 70 will be provided herein below. A menu access button 75 is provided on the face of the handheld controller 15 for accessing the menu functions of the apparatus 10. A numeric keypad 80 is also provided to access specific coded functions of the apparatus 10. An enter button 85 and clear button 90 is provided to work with the keypad 80 as well. The keypad 80 is depicted as a numeric type; however, may be provided with alphanumeric keys to enable transmission of alphabetic or text messages. Finally, a series of selection keys 95 is provided to access displayed items or options on the graphic output screen 60. A functional description of use of the handheld controller 15 is provided herein below.

Figure 3:
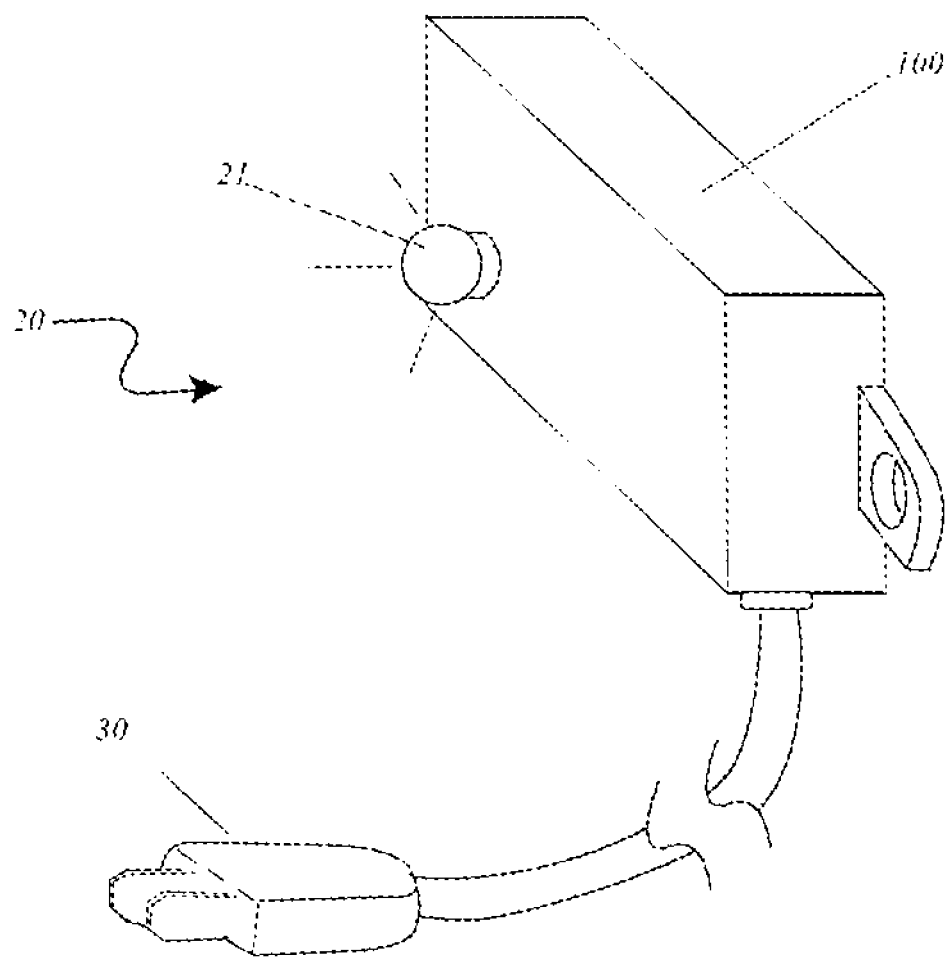
Figure 4:
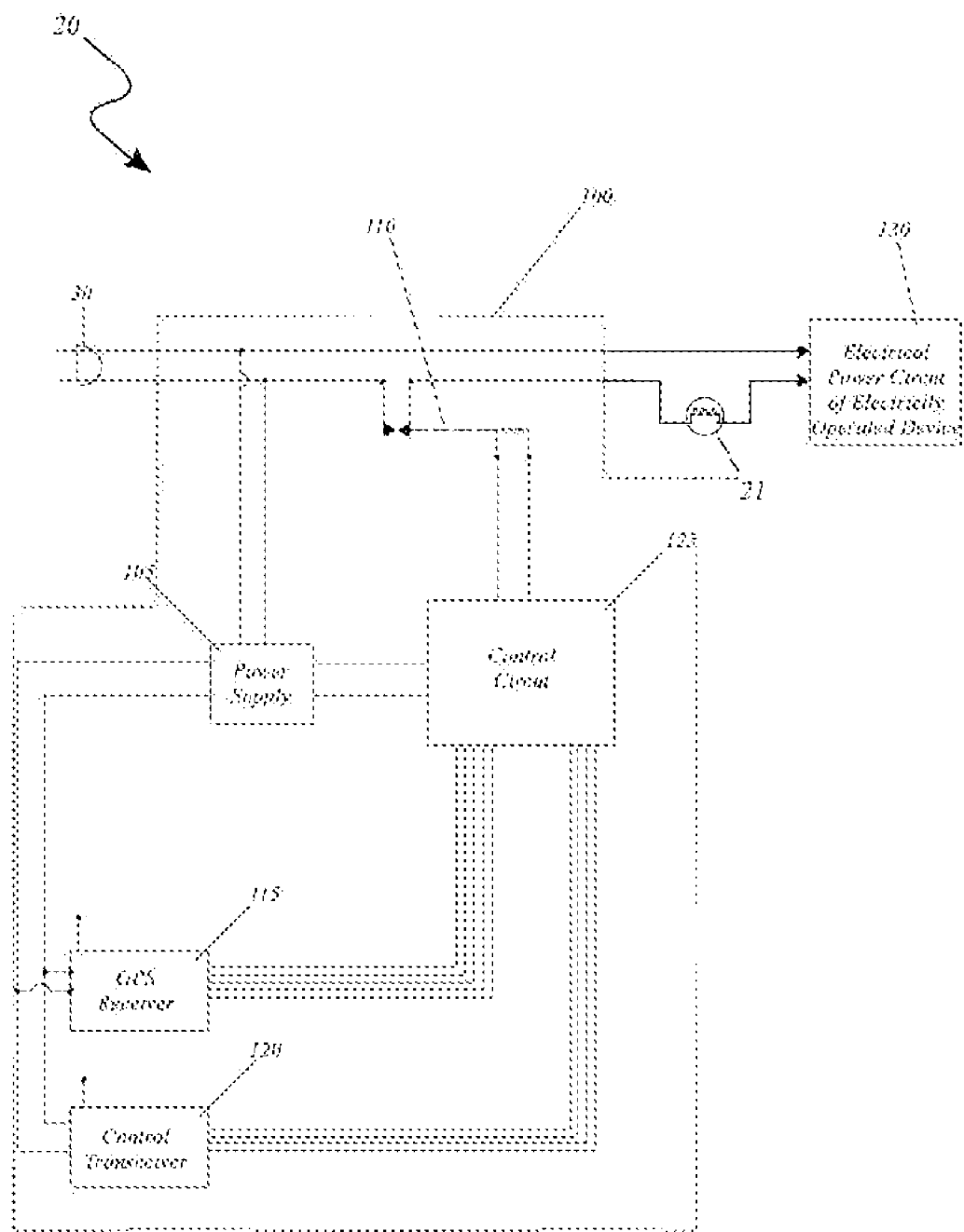

Referring now to FIGS. 3 and 4, a close-up perspective view and an electrical schematic block diagram of the control module 20 portion of the apparatus 10, according to the preferred embodiment of the present invention, are disclosed. The control module 20 comprises a plastic enclosure 100 further comprising an electrical power cord 30, and an indicator light 21. It is envisioned that the plastic enclosure 100 would be installed internal to the electrically-operated device 25 (as shown in FIG. 1), thereby providing the utmost level of security. However, the control module 20 and its plastic enclosure 100 could be installed as an aftermarket kit for existing electrically powered devices. However, said aftermarket units may be less secure than Original Equipment Manufacturer (OEM) units due to the ease of access to the control module 20. A power supply 105 receives alternating current (AC) from the electrical power cord 30 ahead of a main power relay 110. Regulated output voltage from the power supply 105 is conducted to a GPS receiver 115, a control receiver 120 and a controller 125. The GPS receiver 115 comprises a conventional GPS receiver that is well known in the art and capable of communicating positional data to the controller 125. The control receiver 120 is a conventional digital data transceiver that is also well known in the art. The control receiver 120 communicates digital data as received from the transmission relaying system 45 (as shown in FIG. 1) to the controller 125 and in a reverse path as well. The controller 125 is envisioned to be a digital type controller such as a basic stamp package or an embedded processor, though other types of controllers and programming languages could be utilized as well, and as such, should not be interpreted as a limiting factor of the present invention. Upon receiving a valid operational signal from the handheld controller 15 (as shown in FIG. 1) via the transmission relaying system 45 (as shown in FIG. 1), the controller 125 provides an electrical current to the main power relay 110, thus closing the circuit between the electrical power cord 30 and an electrical power circuit of an electrically operated device 130. The indicator light 21 provides a visual means to indicate current is being supplied to the electrically operated device 130. The normally open nature of the main power relay 110 thus ensures a fail-safe operation. If no enabling signal is present, the electrically-operated device 25 (as shown in FIG. 1) will not operate. Finally, the controller 125 is capable of communicating the location information, as provided by the GPS receiver 115, to the control receiver 120 for rebroadcast back to the handheld controller 15 (as shown in FIG. 1 and FIG. 2).

Figure 5:
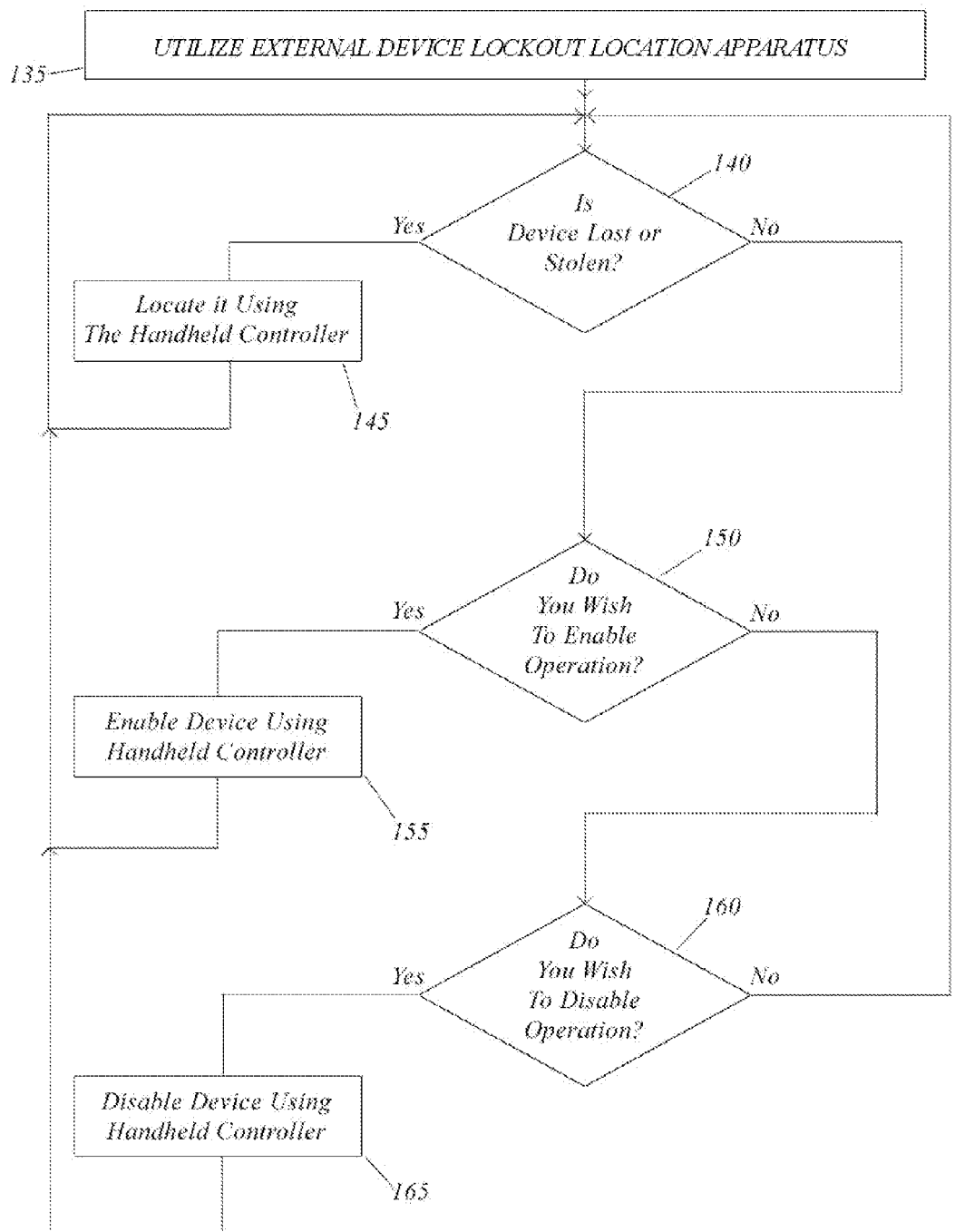

Referring finally to FIG. 5, a functional block diagram of the operational logic employed by the apparatus 10, according to the preferred embodiment of the present invention, is disclosed. The process of utilizing the apparatus 10 begins at a first functional block 135. A decision is made to determine if the electrically-operated device 25 is lost or stolen at a first operational block 140. A positive answer results in accessing the handheld controller 15 to determine the location of the electrically operated device 25 at a second functional block 145. Upon obtaining the coordinates of the electrically-operated device 25, the user can retrieve it, or make arrangements to secure said electrically-operated device 25 through local law enforcement agencies. A negative response to the first operational block 140 indicates that logic will continue to a second operational block 150, wherein the user can determine if enabling the electrically-operated device 25 is required. A positive response allows an enabling action at a third functional block 155. A negative response allows the user to determine if disabling the electrically-operated device 25 is required at a third operational block 160. A positive response allows disabling to occur at a fourth functional block 165, whereupon control returns to the first operational block 140 as is the case with the second functional block 145 and the third functional block 155 as well. A negative response returns the user directly to the first operational block 140.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: installing a control module 20 thereon an electrically-operated device 25 in general conformance with the schematic (see FIG. 3); controlling the apparatus 10 by using the handheld controller 15 as follows:

To initialize any electrically-operated device 25 that contains a control module 20:
Choose—Menu
Select—Enter serial number or Code and press the enter button 85. The command-accepted light-emitting diode 70 on the handheld controller 15 will flash one time.
Initial programming is complete.

To disable any electrically-operated device 25 that contains a control module 20:
Choose—Menu
Select—disable, or "LOCKOUT"
Select—The individual serial number or code of electrically-operated device 25 to be locked, or
Select—Complete categories of all electrically-operated devices 25 you would like to lock out.
Press—enter button 85; the command-accepted light-emitting diode 70 will flash 2 times.
The electrically-operated device 25 is now locked out and will not operate.

To enable any electrically-operated device 25 that contains a control module 20:
Choose—Menu
Select—enable, or "UNLOCK"
Select—The individual serial number or code of electrically-operated device 25 to be un-locked, or
Select—Complete categories of devices you would like to un-lock.
Press enter button 85; the command-accepted light-emitting diode 70 will flash 3 times.
The electrically-operated device 25 is now un-locked and will operate as normal.

To locate any electrically-operated device 25 that contains a control module 20:
Choose—Menu
Select—Use electrically-operated device 25 with GPS tracking, or "LOCATE"
Select—The individual serial number or code of the electrically operated device 25 to be located, or
Select—Complete categories of devices you prefer to locate.
Press—enter button 85, the command-accepted light-emitting diode 70 will flash 4 times and will operate as normal with GPS tracking.
The tool or devices location can be monitored.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A system for monitoring a first location of an electrically-operated device from a remote location and also to transmit command functions from said remote location to a control module located on said electrically-operated device, comprising:
   a handheld controller for wirelessly communicating command functions via a transmitter bi-directional data stream; wherein said handheld controller is battery-operated and further comprises:
   a housing;
   a graphic output screen located in an upper half of said housing;
   a controller antenna located on top of said handheld controller to transmit and receive said transmitter bi-directional data stream from said remote location to said transmission relaying system;
   a transceiver in electrical communication with said controller antenna;
   a set of function keys, comprising:
      a menu access button located below said graphic output screen for accessing menu functions;
      a numeric keypad located below said graphic output screen to access command functions;
      an enter button and a clear button located below said graphic output screen to enter said command functions;
      a series of selection keys located below said graphic output screen to access displayed items or options on said graphic output screen;
      a microprocessor storing preloaded command functions, activated by said function keys and located within said housing, and converting said command functions to an RF signal; and,
      a command-accepted light emitting diode located below said graphic output screen to confirm to a user that said command functions as entered into said handheld controller were acknowledged by said control module;
   a transmission relaying system, for receiving said transmitter bi-directional data stream and generating and transmitting a receiver bi-directional data stream; and,
   a control module removably mounted on said electrically-powered device for receiving said receiver bi-directional data stream, acting on said command functions, and generating physical location data via a GPS tracking system for transmission via said receiver bi-directional data stream, comprising a mountable enclosure, further comprising:
      an electrical power cord for supplying power;
      a power supply receiving an alternating current (AC) from said electrical power cord ahead of a main power relay in electrical communication with said electrically-operated device, wherein said power supply produces and conducts a regulated output voltage to a GPS receiver;
      an indicator light for acknowledging receipt of power to said control module;
      a GPS receiver in electrical communication with said power supply; and,
      a controller, comprising a digital controller or an embedded processor and provides an electrical current to said main power relay, thus closing a circuit between said electrical power cord and an electrical power circuit of said electrically-operated device upon receiving a valid command function from said handheld controller via said transmission relaying system;
      wherein said GPS receiver is a conventional digital data transceiver that generates a position location signal transmitted to a GPS satellite, receives said first location generated by said satellite, and communicates said first location to said controller; and,
      wherein said controller also communicates said first location information as provided by said GPS receiver to said control receiver for rebroadcast back to said handheld controller.

2. The system of claim 1, wherein said menu and command functions comprise control, permissive, lockout and location functions.

3. The system of claim 2, wherein said transmission relaying system further comprises a transmission relay tower for receiving said transmitter bi-directional data stream wirelessly from said handheld controller, converting said transmitter bi-directional data stream to said receiver bi-directional data stream, amplifying said receiver bi-directional data stream, and transmitting said amplified receiver bi-directional data stream to said control module; and receiving said receiver bi-directional data stream wirelessly from said control module, converting said receiver bi-directional data stream to said transmitter bi-directional data stream, amplifying said transmitter bi-directional data stream, and transmitting said amplified transmitter bi-directional data stream to said handheld controller.

4. The system of claim 3, wherein said GPS tracking system generates said first location by triangulation.

5. The system of claim 3, wherein said handheld controller further comprises an alphanumeric keypad.

6. The system of claim 4, wherein said control receiver of said control module also transmits said first location of said electrically-operated device to a remote receiver unit.

7. The method of claim 6, wherein said remote receiver unit further comprises one or more of the following list: a security subscriber control room, a second handheld controller, and a law enforcement agency.

8. The system of a claim 7, wherein said system is operable over a plurality of electrically-operated devices at a plurality of locations.

9. A method for operating a system for monitoring a first location of at least one of a plurality of electrically-operated devices from a remote location and also to transmit command functions from said remote location to a control module located on each of said electrically-operated devices, comprising the following steps:
   providing said system, further comprising:
      a handheld controller for wirelessly communicating command functions via a first transmitter bi-directional data stream, further comprising:
         a housing;
         a graphic output screen located in an upper half of said housing;
         a controller antenna located on top of said handheld controller to transmit and receive said transmitter bi-directional data stream from said second location to a transmission relaying system;
         a transceiver in electrical communication with said controller antenna;
         a set of function keys, comprising:

a menu access button located below said graphic output screen for accessing menu functions;

a numeric keypad located below said graphic output screen to access command functions;

an enter button and a clear button located below said graphic output screen to enter said command functions;

a series of selection keys located below said graphic output screen to access displayed items or options on said graphic output screen;

a microprocessor storing preloaded command functions, activated by said function keys and located within said housing, and converting said command functions to an RF signal; and, a command-accepted light emitting diode located below said graphic output screen to confirm to a user that said command functions as entered into said handheld controller were acknowledged by said control module;

said transmission relaying system, for receiving said transmitter bi-directional data stream and generating and transmitting a receiver bi-directional data stream; and, a control module removably mounted on each of said plurality of electrically-operated devices for receiving said receiver bi-directional data stream, acting on said command functions, and generating physical location data via a GPS tracking system for transmission via said receiver bi-directional data stream, said control module comprises a mountable enclosure further comprises:

an electrical power cord for supplying power;

a power supply receiving an alternating current (AC) from said electrical power cord ahead of a main power relay in electrical communication with said electrically-operated device, wherein said power supply produces and conducts a regulated output voltage to a GPS receiver;

an indicator light for acknowledging receipt of power to said control module;

a GPS receiver in electrical communication with said power supply; and, a controller, comprising a digital controller or an embedded processor and provides an electrical current to said main power relay, thus closing a circuit between said electrical power cord and an electrical power circuit of said electrically-operated device upon receiving a valid command function from said handheld controller via said transmission relaying system;

wherein said GPS receiver is a conventional digital data transceiver that generates a position location signal transmitted to a GPS satellite, receives said first location generated by said satellite, and communicates said first location to said controller; and, wherein said controller also communicates said first location information as provided by said GPS receiver to said control receiver for rebroadcast back to said handheld controller;

installing said control module on each of said plurality of electrically-operated devices;

supplying power to each control module and each of said plurality of electrically-operated devices;

subscribing to a dedicated locator program utilizing said GPS satellite and said transmission relay system;

entering a command function by using said handheld controller, wherein said command function is an initializing function, a disabling function, an enabling function, and a locating function.

10. The method of claim 9, wherein said initializing function further comprises the steps of:

depressing said menu access button on said handheld controller;

choosing said initializing function and depressing said enter button;

entering a serial number or a code number for a particular electrically-operated device on said numeric keypad and depressing said enter button; and, verifying said command-accepted light-emitting diode flashes;

wherein said previous steps programs and initializes said system.

11. The method of claim 9, wherein said disabling function further comprises the steps of:

depressing said menu access button on said handheld controller;

choosing said disabling function and depressing said enter button;

entering a serial number or a code number for said particular electrically-operated device on said numeric keypad and depressing said enter button; and, verifying said command-accepted light-emitting diode flashes a first multiple number of times;

wherein said previous steps disables said particular electrically-operated device.

12. The method of claim 11, further comprising the step of:

choosing a category of a particular electrically-operated device from said plurality of electrically-operated devices;

wherein said previous step disables said category of a particular electrically-operated device.

13. The method of claim 9, wherein said enabling function further comprises the steps of:

depressing said menu access button on said handheld controller;

choosing said enabling function and depressing said enter button;

entering a serial number or a code number for a particular electrically-operated device on said numeric keypad and depressing said enter button; and, verifying said command-accepted light-emitting diode flashes a second multiple number of times;

wherein said previous steps enables said particular electrically-operated device to operate.

14. The method of claim 13, further comprising the step of:

choosing a category of a particular electrically-operated device from said plurality of electrically-operated devices;

wherein said previous step enables said category of a particular electrically-operated device to operate.

15. The method of claim 9, wherein said locating function further comprises the steps of:

depressing said menu access button on said handheld controller;

choosing said locating function and depressing said enter button;

entering a serial number or a code number for said a particular electrically-operated device on said numeric keypad and depressing said enter button; and, verifying said command-accepted light-emitting diode flashes a third multiple number of times;

wherein said previous steps locates said particular electrically-operated device via said GPS tracking system.

16. The method of claim 15, further comprising the step of:
choosing a category of a particular electrically-operated device from said plurality of electrically-operated devices;
wherein said previous step locates said category of a particular electrically-operated device via said GPS tracking system.

\* \* \* \* \*